(12) United States Patent
Menke et al.

(10) Patent No.: US 10,335,731 B2
(45) Date of Patent: Jul. 2, 2019

(54) FILTER DEVICE FOR A MOTOR VEHICLE

(71) Applicant: Dr. Ing. h.c. F. Porsche Aktiengesellschaft, Stuttgart (DE)

(72) Inventors: Andreas Menke, Vaihingen a.d.Enz/Enzweihingen (DE); Ulrich Essig, Wendlingen (DE); Tobias Friedrich, Wimsheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 155 days.

(21) Appl. No.: 15/485,243

(22) Filed: Apr. 12, 2017

(65) Prior Publication Data

US 2017/0296962 A1 Oct. 19, 2017

(30) Foreign Application Priority Data

Apr. 14, 2016 (DE) .................. 10 2016 106 920

(51) Int. Cl.
*B01D 53/04* (2006.01)
*F02M 25/08* (2006.01)

(52) U.S. Cl.
CPC ..... *B01D 53/0446* (2013.01); *B01D 53/0415* (2013.01); *B01D 2253/102* (2013.01); *B01D 2257/702* (2013.01); *B01D 2259/4516* (2013.01); *B01D 2259/4566* (2013.01); *F02M 25/0854* (2013.01)

(58) Field of Classification Search
CPC ............ B01D 53/0415; B01D 53/0446; B01D 2253/102; B01D 2257/702; B01D 2259/4516; B01D 2259/4566; F02M 25/0854

USPC ............ 96/121, 130–132, 139, 152; 123/519
See application file for complete search history.

(56) References Cited

U.S. PATENT DOCUMENTS

| 5,501,723 A | 3/1996 | Andress et al. |
| 5,564,398 A * | 10/1996 | Maeda ............... F02M 25/0854 |
| | | 123/519 |
| 5,878,729 A | 3/1999 | Covert et al. |

(Continued)

FOREIGN PATENT DOCUMENTS

| DE | 4320384 A1 | 12/1994 |
| EP | 1446569 B1 | 8/2004 |

(Continued)

*Primary Examiner* — Frank M Lawrence, Jr.
(74) *Attorney, Agent, or Firm* — Leydig, Voit & Mayer, Ltd.

(57) ABSTRACT

A filter device for a motor vehicle includes a housing having a receiving space with a first chamber having an adsorption medium and a second chamber having a further adsorption medium, wherein the first chamber and the second chamber are designed such that flow can pass through them in series from a first inflow opening of the filter device to an outflow opening of the filter device via the receiving space. The filter device further includes a partition between the first chamber and the second chamber for a series flow through the first chamber and the second chamber; a flow transfer chamber for flow through the receiving space, the flow transfer chamber being designed to connect the first chamber and the second chamber such that flow can pass through; and a barrier formed in the receiving space for diverting the loading flow and/or the purging flow.

10 Claims, 4 Drawing Sheets

(56) References Cited

U.S. PATENT DOCUMENTS

| | | | |
|---|---|---|---|
| 6,524,374 B2 * | 2/2003 | Moriyama | B01D 53/0415 123/519 |
| 6,540,815 B1 | 4/2003 | Hiltzik et al. | |
| 6,551,388 B1 | 4/2003 | Oemcke et al. | |
| 7,294,179 B2 * | 11/2007 | Kim | B01D 53/0415 123/519 |
| 8,529,676 B2 | 9/2013 | Sugiura | |
| 2003/0024397 A1 * | 2/2003 | Meiller | F02M 25/0854 96/139 |
| 2005/0022796 A1 * | 2/2005 | Zuchara | B01D 53/0415 123/519 |
| 2007/0119306 A1 * | 5/2007 | Yamada | B60K 15/03504 96/131 |
| 2011/0315126 A1 | 12/2011 | Yoshida et al. | |
| 2013/0312712 A1 * | 11/2013 | Yamamoto | F02M 25/0854 123/519 |
| 2014/0165843 A1 | 6/2014 | Omichi et al. | |
| 2017/0001141 A1 | 1/2017 | Kishida et al. | |

FOREIGN PATENT DOCUMENTS

| | | | |
|---|---|---|---|
| JP | H 11343935 A | | 12/1999 |
| JP | 2013-130084 | * | 4/2013 |
| JP | 2013245593 A | | 12/2013 |
| JP | 2014118896 A | | 6/2014 |
| WO | WO 2015111704 A1 | | 7/2015 |

* cited by examiner

FILTER DEVICE FOR A MOTOR VEHICLE

CROSS REFERENCE TO RELATED APPLICATIONS

This application claims benefit to German Patent Application No. DE 10 2016 106 920.5, filed Apr. 14, 2016, which is hereby incorporated by reference herein.

FIELD

The invention relates to a filter device for a motor vehicle.

BACKGROUND

Modern motor vehicles, in order to reduce tank leakage, that is to say an evaporation of fuel from a fuel tank of the motor vehicle, have reduction means in the form of filter devices which have activated carbon, so-called activated carbon filters. Owing to intensified demands with regard to consumption and emissions of motor vehicles, for example the change from LEVII to LEVIII in the USA, there is a need for a reduced purging quantity for the regeneration of activated carbon filters. A diffusion of hydrocarbons, also referred to as "bleeding emission", is at the forefront of the reductions being sought.

A regeneration performance of the filter device in which the activated carbon is arranged horizontally, that is to say is loaded and purged horizontally, may possibly lead, in the case of small purging quantities of modern drive systems, to inadequate regeneration of the activated carbon, for example for so-called SHED tests. SHED tests are emissions tests in a gas-tight test chamber. An influence of the bleeding emissions on the regeneration of the activated carbon is evident here in particular.

The patent EP 1 446 569 B1 discloses a filter device for a motor vehicle, which filter device, for the reduction of fuel vapour emissions, has activated carbon as adsorption medium.

The U.S. Pat. No. 8,443,786 B2 discloses a filter device for a motor vehicle, the final chamber of which, with a connection to the atmosphere, has an activated carbon which differs from the other chambers. This likewise emerges from the laid-open specification US 2011/0315126 A1.

The laid-open specification DE 43 20 384 A1 has disclosed a filter device for a motor vehicle, the housing of which has at least two partitions which run between the atmosphere port and the tank port.

The U.S. Pat. No. 6,524,374 B2 describes a container in which fuel vapor flows through an inflow opening into the container, which has a chamber with adsorption medium through which the fuel vapor flows. Adsorbent holding filters, an adsorbent holding plate and an adsorbent holding spring are formed in the container.

The U.S. Pat. No. 8,529,676 B2 has disclosed a filter device for a motor vehicle, having a container, which has an adsorption medium, and having a flow regulating device close to an air connection port.

SUMMARY

In an embodiment, the present invention provides a filter device for a motor vehicle. The filter device includes a housing having a receiving space with a first chamber having an adsorption medium and a second chamber having a further adsorption medium, wherein the first chamber and the second chamber are designed such that flow can pass through them in series from a first inflow opening of the filter device to an outflow opening of the filter device via the receiving space, and wherein a first flow path of a loading flow and a second flow path of a purging flow can be formed. The filter device further includes a partition between the first chamber and the second chamber for a series flow through the first chamber and the second chamber; a flow transfer chamber for flow through the receiving space, the flow transfer chamber being designed to connect the first chamber and the second chamber such that flow can pass through; and a barrier formed in the receiving space for diverting the loading flow and/or the purging flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
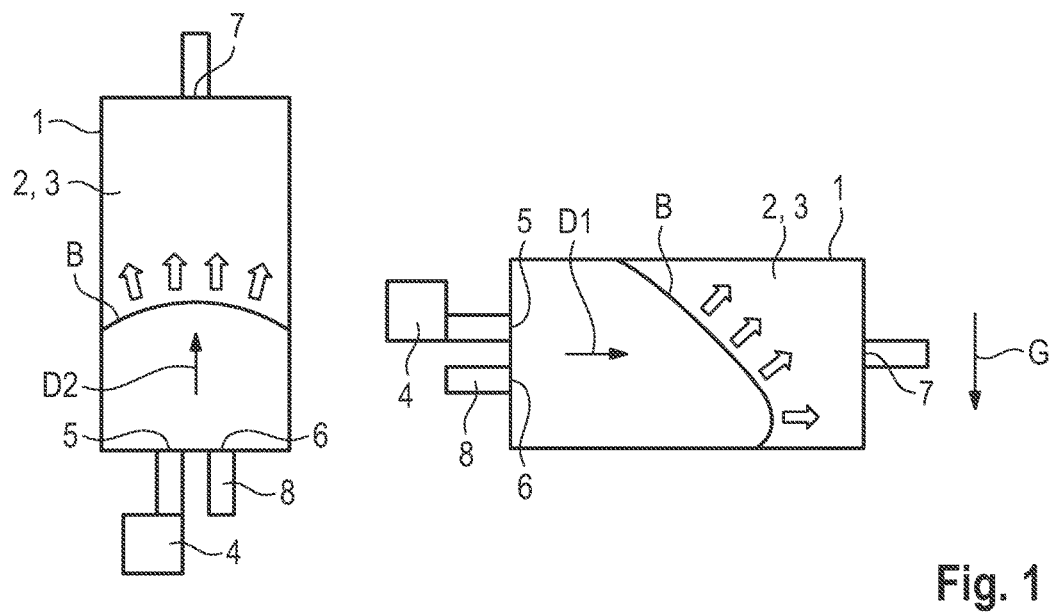
FIG. 1 shows, in a diagrammatic illustration, a loading of an activated carbon in the case of a vertical flow through it and, in a diagrammatic illustration, a loading of an activated carbon in the case of a horizontal flow through it.

An improved filter device for a motor vehicle is described herein.

A filter device according to an embodiment of the invention for a motor vehicle comprises a housing having a receiving space with a first chamber, which has an adsorption medium, and with a second chamber, which has a further adsorption medium. The chambers are designed such that flow can pass through them in series from a first inflow opening of the filter device to an outflow opening of the filter device via the receiving space. A first flow path of a loading flow and a second flow path of a purging flow can be formed. For the series flow through the chambers, a partition is formed between the chambers, wherein, for the flow through the receiving space, a flow transfer chamber is designed to connect the two chambers such that flow can pass through. For the diversion of the loading flow and/or of the purging flow, the receiving space has a barrier.

Flow passes through the filter device under gravimetric influence. This means, in other words, under the action of gravitational force. With the throughflow normally being oriented transversely relative to gravitational force, there is thus a resulting uneven distribution of a load on the adsorption medium. In particular, regions of the adsorption medium situated at the bottom in the receiving space are predominantly loaded, such that regions situated above remain unloaded. However, after the lower regions of the chamber that is flowed through first in the flow direction have been fully loaded, the loading flow passes over into the adjacent chamber, such that full loading of the chamber that is flowed through first, or of the adsorption medium accommodated therein, is not realized. This results in performance deficiencies of the filter device, which in particular results in increased bleeding emissions.

With the aid of the barrier formed in the receiving space, it is possible for the flow through the receiving space in the form of the loading and purging flow to be controlled, or in other words diverted or conducted. It is thus possible to effect a uniform load distribution and purging of the adsorption medium, whereby a reduction of the emissions, in particular of the bleeding emissions, can be realized.

The fact that the barrier is formed in the receiving space yields effective utilization of the available structural space of the filter device. This is particularly important because the structural space in modern motor vehicles is becoming ever more scarce, and in particular, effective utilization of an absorption capacity of the adsorption medium is sought for the purposes of conserving resources and saving costs with regard thereto, and is realized with the filter device according to an embodiment of the invention.

In one refinement of the filter device according to an embodiment of the invention, the barrier is in the form of a nonwoven masking of a nonwoven of the filter device. Nonwovens are designed for preloading the adsorption medium, which is normally present in the form of an activated carbon, such that it is prevented from being worn down in the receiving space. Thus, it is possible for the nonwoven that is already present to be utilized in an effective manner, by redesign or masking, for flow diversion.

The effective utilization of the nonwoven is successfully utilized for increasing the performance of the filter device by virtue of the nonwoven masking being formed as a compaction of the nonwoven and/or as a lamination of the nonwoven with a material which is entirely impermeable to gas or with a material which has lower gas permeability than the nonwoven.

For fast loading of the filter device during operation of the motor vehicle or during refuelling, it is particularly advantageous for the nonwoven masking to be formed at least in a range between ⅓ and ⅔ of a height of the adsorption medium.

In a further refinement of the filter device according to an embodiment of the invention, the nonwoven masking has the lamination in sections. The advantage is a further improved diversion of the throughflow.

In a further refinement of the filter device according to an embodiment of the invention, the barrier is in the form of a barrier flap, wherein the barrier is arranged in the flow transfer chamber. The barrier flap may in this case be provided in addition to the nonwoven masking or on its own. The barrier flap is formed in accordance with a check valve principle, whereby a targeted diversion of the throughflow either of the loading flow or of the purging flow can be effected.

If the barrier flap is formed such that it cannot be passed through by flow in the direction of the first throughflow path and can be passed through by flow in the direction of the second flow path, the adsorption medium of the chamber arranged upstream of the barrier flap in the throughflow direction is firstly filled up until the filling has reached a flap height of the barrier flap, and a transfer of flow into the chamber formed downstream can occur. In other words, the adsorption medium can be filled from bottom to top before a transfer of flow occurs. Since the barrier flap is open in the direction of the second flow path, the adsorption medium can be purged and thus regenerated over its entire height.

In a further refinement, the barrier is in the form of a diffusion web in the flow transfer chamber. Here, the diffusion web may be formed in addition to the nonwoven masking and/or the barrier flap or on its own.

The diffusion web is advantageously produced from a material which is entirely impermeable to gas. Said diffusion web could however likewise be produced from a material with limited gas permeability, wherein said diffusion web then takes effect in the presence of relatively high flow speeds, but only to a limited extent in diffusion processes such as arise during the emissions test in the motor vehicle.

The action of the diffusion web corresponds in principle to the barrier flap, but it is the case both in the direction of the first flow path and in the direction of the second flow path that a diversion of the corresponding flow takes place.

For cost reduction in the production of the filter device according to an embodiment of the invention, the adsorption medium corresponds to the further adsorption medium.

To further increase the performance of the filter device, the adsorption medium is a conventional activated carbon, and the further adsorption medium is 1100 pellet coal. It is preferable for the penultimate chamber in the flow direction to be filled with the adsorption medium in the form of 1100 pellet coal.

FIG. 1 shows, in a diagrammatic illustration, a loading of a filter device 1 when its adsorption medium 3, which is arranged in a receiving space 2 and which is in the form of a conventional activated carbon, is flowed through vertically and, in a diagrammatic illustration, a loading when said adsorption medium is flowed through horizontally. The filter device 1 is connected, such that flow can pass through, to a tank 4 of a motor vehicle at a first inlet opening 5 of the filter device 1. In other words, fuel vapours that form in the tank 4 are conducted via the first inlet opening 5 into the filter device 1. Hydrocarbons of the fuel vapours are, with the aid of the adsorption medium 3, bonded to the latter, or in other words are adsorbed by the adsorption medium 3, and are supplied to an internal combustion engine of the motor vehicle for the purposes of combustion only when an outlet opening 6 is opened up by corresponding means, generally a valve. With the opening-up of the outlet opening 6, fresh air is drawn in via a second inlet opening 7 of the filter device 1, wherein, in addition to a release of the hydrocarbons from the adsorption medium 3, purging, in other words a regeneration of the adsorption medium 3, is effected. The opening-up of the outlet opening 6 may in this case be realized by way of a direct opening thereof or by means of a line 8 which connects the filter device 1 to the intake tract and through which flow can pass and which has the valve.

Depending on the orientation of a direction of a flow through the adsorption medium 3, an influence of the gravitational force G results in more or less successful adsorption and purging, because a density difference exists between hydrocarbons of the fuel particles and the fresh air. For example, n-butane has a density of 2.7 kg/m$^3$, whereas the air that is present in the filter device 1 has a much lower density, of 1.2 kg/m$^3$. A direction of loading of the adsorption medium 3 is negatively influenced in the case of a horizontal throughflow D1, in other words in the case of a horizontally oriented receiving space 2 of the filter device 1, in relation to a throughflow direction D2 of a vertically oriented receiving space 2, as illustrated in FIG. 1. The loading, which has a loading front B, of the adsorption medium 3 is non-uniform, and thus asymmetrical. The loading front B denotes a boundary between a section of the adsorption medium 3 which is partially or fully wetted with hydrocarbons and a section of the adsorption medium 3 which is partially or entirely free from hydrocarbons.

The receiving space 2 is formed in a housing 16 of the filter device 1. Normally, the filter device 1 has multiple chambers 9, 10, which are arranged parallel to one another and are designed for regeneration purposes, in the receiving space 2, which chambers are flowed through in series and are loaded in series and are separated from one another by partitions through which flow cannot pass and which extend in the direction of the throughflow. In the exemplary embodiments illustrated, the filter device 1 has a first chamber 9 with the adsorption medium 3 and a second chamber 10 with a further adsorption medium, which chambers are separated from one another by a partition 17. The chambers 9, 10 are connected to one another, such that flow can pass through, by means of a flow transfer chamber 18, such that said chambers can be flowed through in series. It would likewise be possible for further chambers to be formed. In this exemplary embodiment, the adsorption medium 3 corresponds to the further adsorption medium and is in the form of conventional activated carbon.

Figure 2:
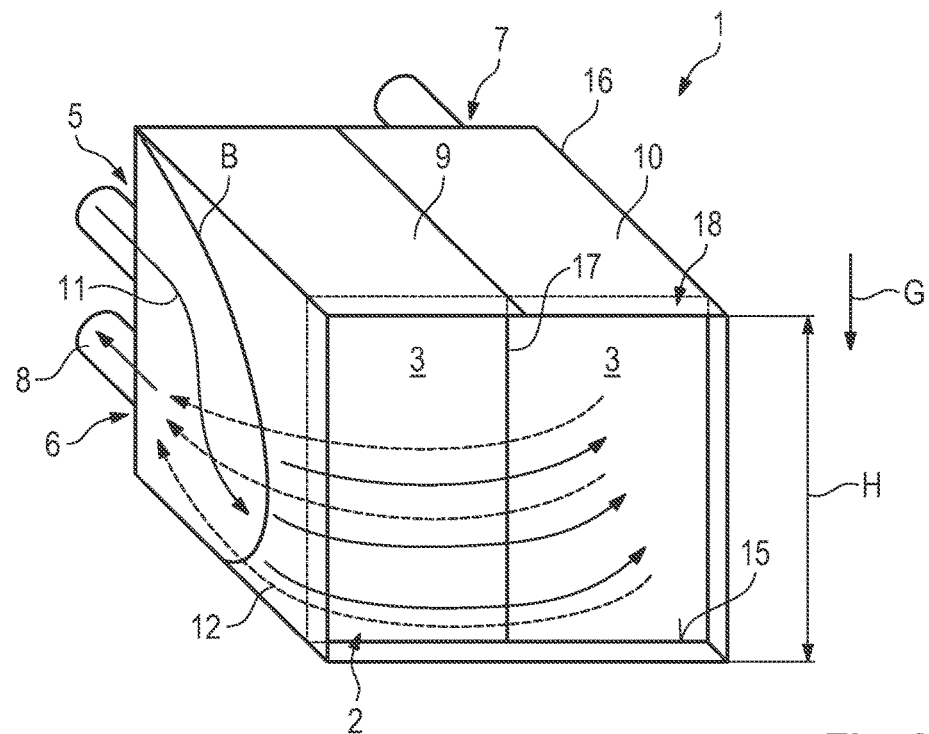
FIG. 2 shows, in a schematic illustration, a filter device according to the prior art.

As a result of predominant loading of the adsorption medium 3, or of the activated carbon 3, in the lower region, as illustrated in the right-hand part of FIG. 1, loading of the second chamber 10 arranged downstream of the first chamber 9 occurs at an earlier point in time proceeding from said lower region, see FIG. 2. In the event of further loading, it is then possible for increased, so-called bleeding emissions to occur in the second chamber 10. If multiple receiving spaces 2 are formed, it is generally the final receiving space 2 of the filter device 1, normally a measurement chamber, that has the increased bleeding emissions.

FIG. 2 shows a filter device 1 according to the prior art in a schematic illustration. The first chamber 9 and the second chamber 10 are flowed through in series. The two chambers 9, 10 are oriented such that flow can pass through them horizontally with respect to gravitational force G.

Proceeding from the first inlet opening 5, a first flow path 11 of the fuel vapours that are conducted out of the tank 2 is formed via the first chamber 9 and subsequently into the second chamber 10. If further receiving spaces 2 were formed, these would likewise be flowed through in series in accordance with their arrangement.

Via said first flow path 11, which is illustrated by a solid line, it is in effect the case that cells of the activated carbon 3 are saturated, or in other words loaded, in succession. Discharging of load from the cells of the activated carbon 3 occurs in the reverse direction along a second flow path 12 to the outlet opening 6, as illustrated by dashed lines.

In order that improved saturation or loading of the activated carbon 3 of the individual chambers 9, 10 is possible, various measures in the form of barriers 13 are proposed. The barriers 13 serve for altering the conventional flow paths 11, 12 that are formed in the filter device 1 according to the prior art.

Figure 3:
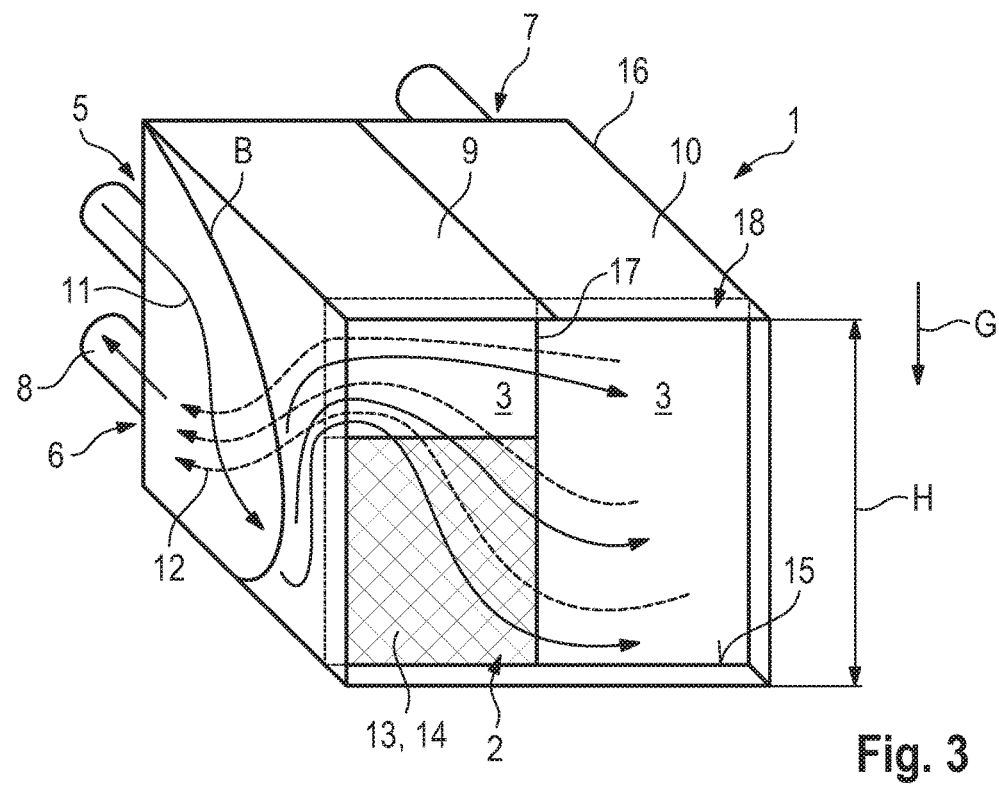
FIG. 3 shows, in a schematic illustration, a filter device according to a first embodiment of the invention.
Figure 4:
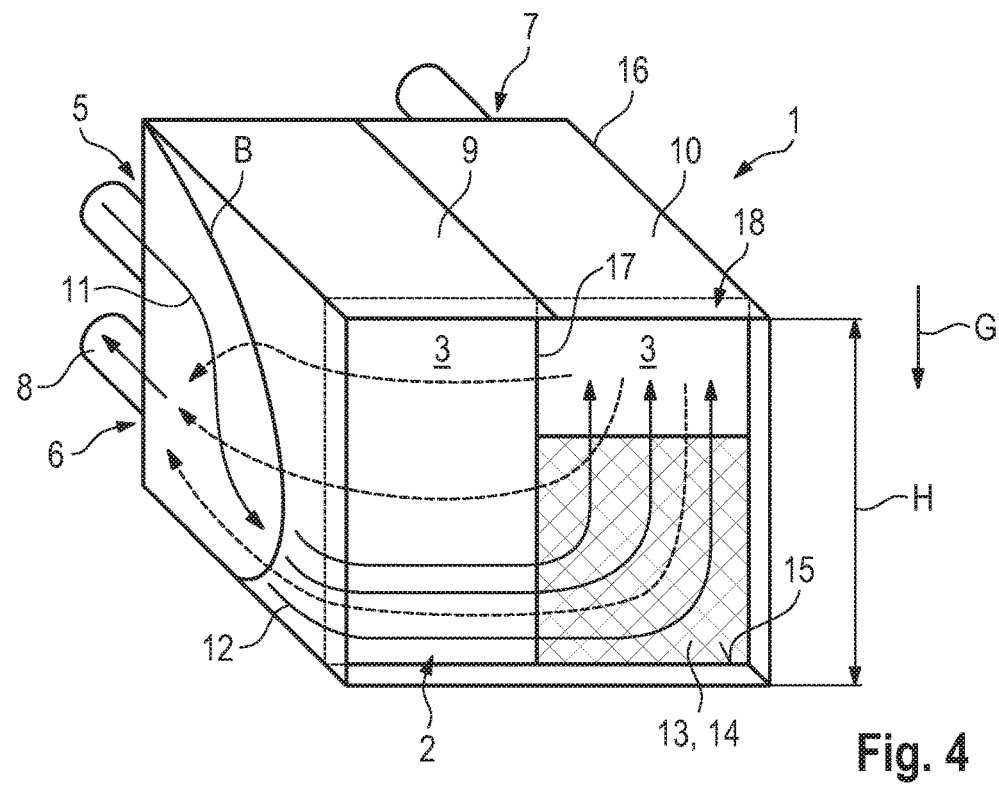
FIG. 4 shows, in a schematic illustration, the filter device according to a second embodiment of the invention.

FIGS. 3 and 4 illustrate a filter device 1 according to first and second embodiments of the invention. The filter device 1 has a gas-permeable nonwoven 14, which serves for preloading a carbon bed of the activated carbon 3 so as to prevent it from being worn down. Said filter device is normally of homogeneous construction and permits a uniform loading and purging air flow over its entire cross section. In other words, a loading flow, which is the fuel vapour flow entering the filter device 1 via the first inlet opening 5, is conducted along the first flow path 11, and the purging air flow, which is the air flow entering the filter device 1 via the second inlet opening 7, is conducted along the second flow path, uniformly over the cross section of the nonwoven 14. The purging air flow has varying quantities of hydrocarbons, which are entrained by it in a manner dependent on the discharging of load.

To realize a preferred flow path 11, 12, the nonwoven 14 is compacted at selected locations. In this way, and/or by way of lamination of the nonwoven 14 with a gas-impermeable material, which may both separately or jointly also be referred to as nonwoven masking, a barrier 13 is formed, by way of which the preferred flow paths 11, 12 can be introduced in targeted fashion. This is illustrated by way of example in FIGS. 3 and 4, in which the barrier 13 in the form of a compacted nonwoven 14 is arranged in the first chamber 9 and in the second chamber 10 respectively.

The nonwoven 14 may also have the lamination in sections, or in zones or regions, in order that a desired flow direction can be achieved.

The lamination may be formed on each nonwoven 14 of the chambers 9, 10, preferably in a manner dependent on which zone of the activated carbon 3 is to be preferentially loaded or purged. It is also possible for the lamination to be implemented in a price-dependent manner, for example if one chamber 9, 10 has a smaller cross-section than the other chamber 10, 9 and a lamination of equal height covers a smaller area and is thus less expensive.

The barrier 13 is arranged in a region of the chambers 9, 10 which is normally loaded before another region of the chambers 9, 10. Preferential loading and discharge of load can be achieved by means of the barrier 13.

To realize fast loading during operation of the motor vehicle or during refuelling of the motor vehicle, it is preferable for the nonwoven masking 13 to be formed in a range between $\frac{1}{3}$ and $\frac{2}{3}$ of a height H of the activated carbon 3.

Figure 5:
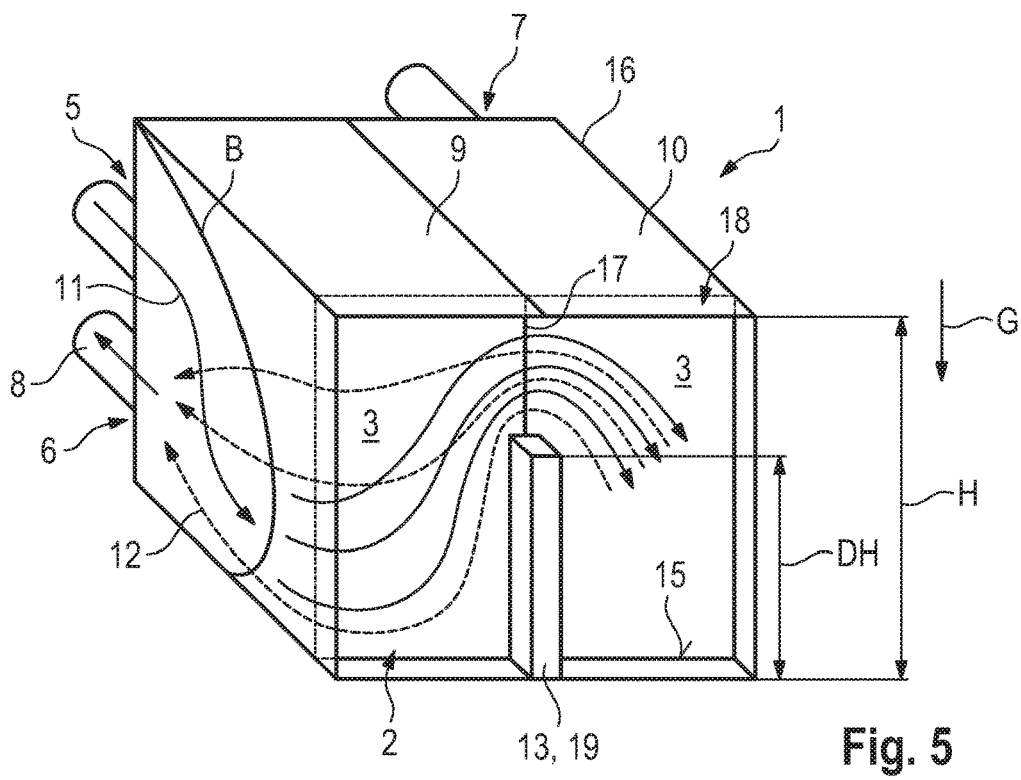
FIG. 5 shows, in a schematic illustration, the filter device according to a third embodiment of the invention.

FIG. 5 illustrates the filter device 1 according to a third embodiment of the invention with a barrier 13 in the form of a diffusion web 19. The diffusion web 19 is arranged between the first chamber 9 and the second chamber 10 in the flow transfer chamber 18, and is formed as a constituent part of a housing 16 of the filter device 1. It would likewise be possible for the diffusion web 19 to also be a constituent part of a cover of the filter device 1 or of a welded composite of the filter device 1 or of an assembled composite of the two.

The diffusion web 19 is arranged on a base 15 of the housing 16 in the flow transfer chamber 18 and extends transversely with respect to the flow direction over a diffusion web height DH. Thus, in the region of the diffusion web 19, a transfer of the loading flow and of the purging flow into the second chamber 10 is prevented. The transfer of flow occurs only when loading or purging of those regions of the adsorption medium 3 which are formed over the diffusion web height DH has already occurred.

Figure 6:
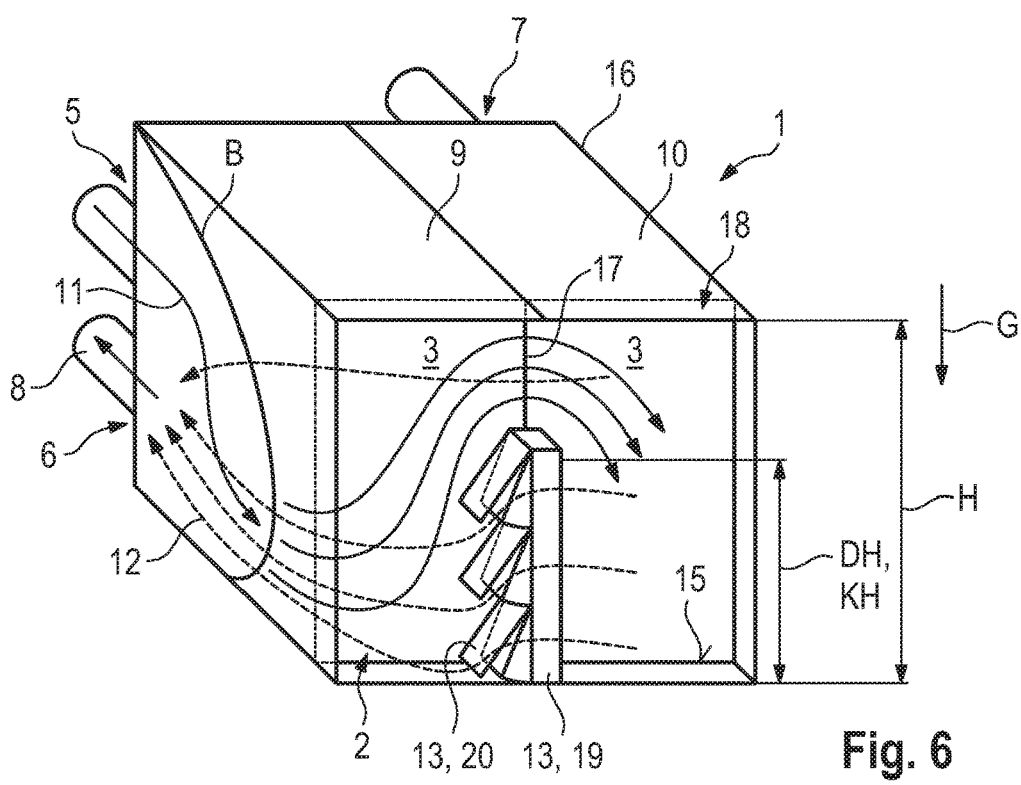
FIG. 6 shows, in a schematic illustration, the filter device according to a fourth embodiment of the invention.

The filter device 1 according to a fourth embodiment of the invention is constructed as per FIG. 6. The barrier 13 is in the form of a barrier flap 20. In the present exemplary embodiment, three barrier flaps 20 are arranged one above the other, in other words so as to extend transversely with respect to the throughflow. It would likewise also be possible for some other number of barrier flaps 20 to be formed.

The barrier flaps 20 are positioned between the first chamber 9 and the second chamber 10 in the flow transfer space 18, and are constructed, in terms of their operating principle, so as to correspond to a check valve. In the direction of the first flow path 11, the barrier flaps 20 are closed, whereas flow can pass through them, and they are therefore open, in the direction of the second flow path 12. In this way, the regenerating air flowing in from the second inlet opening 7 can flow entirely over all of the activated carbon 3 of the chambers 9, 10.

The barrier flaps 20 are, proceeding from the base 15, arranged in the flow transfer chamber 18 over a flap height KH transversely with respect to the throughflow direction. Thus, in the region of the barrier flaps 20, a transfer of the loading flow into the second chamber 10 is prevented until loading of the adsorption medium 3 over the flap height KH has taken place.

In the fourth embodiment illustrated, in addition to the barrier flaps 20, the diffusion web 19 is in the form of a barrier. it is however likewise possible for the barrier flaps 20 to be formed on their own.

In an embodiment of the filter device 1 according to the invention which is not illustrated in any more detail, the first chamber 9 is filled with 1100 pellet coal. In an embodiment of the filter device with, for example, three receiving spaces 2, that is to say with the first chamber 9, the second chamber 10 and a further chamber which is arranged downstream of the second chamber 10, the first chamber 9 and the second chamber 10 should be equipped with 1100 pellet coal, and the further chamber advantageously has the conventionally used activated carbon 3.

Figure 7:
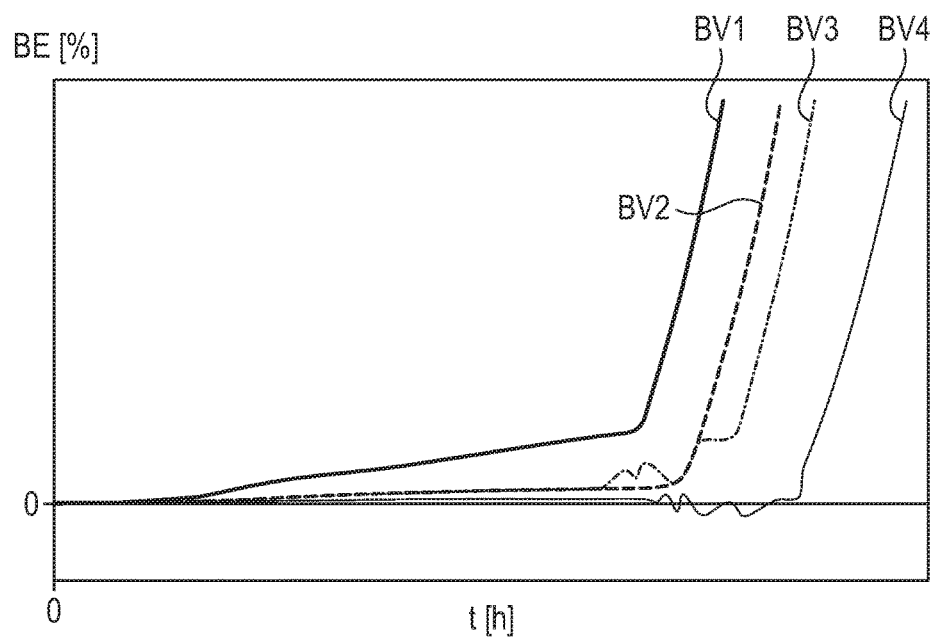
FIG. 7 shows, in a t-BE diagram, bleeding emissions versus time in filter devices according to various embodiments of the invention.

In FIG. 7, in a t-BE diagram, profiles of bleeding emissions BE of various embodiments of the filter device 1 are plotted versus the time t. The solid line shows the bleeding emissions profile BV1 of the filter device 1 according to the prior art. It is clear that the filter device 1 according to the invention of the first exemplary embodiment, the bleeding emissions profile BV2 of which is illustrated using dashed lines, yields a considerable reduction of the bleeding emissions in relation to the filter device 1 of the prior art. However, the filter device 1 according to the invention as per the third exemplary embodiment, the bleeding emissions profile BV3 of which is illustrated using dash-dotted lines, and the filter device 1 according to the fourth exemplary embodiment, the bleeding emissions profile BV4 of which is illustrated using dotted lines, exhibit a further considerable reduction of the bleeding emissions.

The discussed barriers 13 in the form of the nonwoven masking, the diffusion web 19, of the barrier flaps 20 and a combination of different filling of the chambers 9, 10 with the adsorption medium 3 and the further adsorption medium may self-evidently be combined with one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A filter device for a motor vehicle, comprising:
   a housing having a receiving space disposed therein;
   a partition dividing the receiving space into a first chamber, a second chamber, and a flow transfer chamber;
   an adsorption medium disposed in the first chamber;
   a further adsorption medium disposed in the second chamber; and
   a barrier formed in the receiving space at an interface between the flow transfer chamber and one of the first chamber or the second chamber,
   wherein a first flow path of a loading flow and a second flow path of a purging flow extend, in a horizontal direction, between a first inflow opening of the filter device and an outflow opening of the filter device via the receiving space,
   wherein the first and the second flow include, in a series connection, the first chamber and the second chamber;
   wherein the flow transfer chamber connects, in the series connection, the first chamber and the second chamber,
   wherein the flow transfer chamber is disposed at an end of the housing opposite an end of the housing at which the first inflow opening and the outflow opening are disposed, and
   wherein the barrier formed in the receiving space is configured to divert the loading flow and/or the purging flow in a vertical direction.

2. The filter device as claimed in claim 1, wherein the barrier is in the form of a nonwoven masking of a nonwoven of the filter device.

3. The filter device as claimed in claim 2, wherein the nonwoven masking is formed as a compaction of the nonwoven and/or as a lamination of the nonwoven with a material which is entirely impermeable to gas or with a material which has lower gas permeability than the nonwoven.

4. The filter device as claimed in claim 2, wherein the nonwoven masking is arranged at least in a range between ⅓ and ⅔ of a height of the adsorption medium.

5. The filter device as claimed in claim 3, wherein the nonwoven masking has the lamination in sections.

6. A filter device for a motor vehicle, comprising:
   a housing having a receiving space disposed therein;
   a partition dividing the receiving space into a first chamber, a second chamber, and a flow transfer chamber;
   an adsorption medium disposed in the first chamber;
   a further adsorption medium disposed in the second chamber; and
   a barrier in the form of a barrier flap disposed in the receiving space,
   wherein a first flow path of a loading flow and a second flow path of a purging flow extend, in a horizontal direction, between a first inflow opening of the filter device and an outflow opening of the filter device via the receiving space, wherein the first flow path include and the second flow include, in a series connection, the first chamber and the second chamber;

wherein the flow transfer chamber connects, in the series connection, the first chamber and the second chamber, wherein the flow transfer chamber is disposed at an end of the housing opposite an end of the housing at which the first inflow opening and the outflow opening are disposed, wherein the barrier is configured to divert the loading flow and/or the purging flow in a vertical direction, and wherein the barrier is adjacent to a wall of the housing that is opposite a wall of the housing in which the first inflow opening and the outflow opening are located.

7. The filter device as claimed in claim 6, wherein the barrier flap is formed such that it cannot be passed through by flow in the direction of the first flow path and can be passed through by flow in the direction of the second flow path.

8. A filter device for a motor vehicle, comprising:
a housing having a receiving space disposed therein;
a partition dividing the receiving space into a first chamber, a second chamber, and a flow transfer chamber;
an adsorption medium disposed in the first chamber;
a further adsorption medium disposed in the second chamber; and
a barrier in the form of a diffusion web disposed in the flow transfer chamber, wherein a first flow path of a loading flow and a second flow path of a purging flow extend, in a horizontal direction, between a first inflow opening of the filter device and an outflow opening of the filter device via the receiving space, wherein the first flow path include and the second flow include, in a series connection, the first chamber and the second chamber;

wherein the flow transfer chamber connects, in the series connection, the first chamber and the second chamber, wherein the flow transfer chamber is disposed at an end of the housing opposite an end of the housing at which the first inflow opening and the outflow opening are disposed, wherein the barrier is configured to divert the loading flow and/or the purging flow in a vertical direction, wherein the barrier is adjacent to a wall of the housing that is opposite a wall of the housing in which the first inflow opening and the outflow opening are located.

9. The filter device as claimed in claim 1, wherein the adsorption medium corresponds to the further adsorption medium.

10. The filter device as claimed in claim 1, wherein the adsorption medium is an activated carbon, and the further adsorption medium is pelletized coal.

* * * * *